(12) United States Patent
El-Wardany et al.

(10) Patent No.: US 12,497,974 B2
(45) Date of Patent: Dec. 16, 2025

(54) COST-EFFECTIVE SOLID-STATE DEPOSITION OF FUNCTIONALLY GRADED TITANIUM HOLLOW FAN BLADE SHEATH FOR IMPROVED GALVANIC CORROSION RESISTANCE

(71) Applicant: RTX Corporation, Farmington, CT (US)

(72) Inventors: Tahany El-Wardany, Vernon, CT (US); Sonia Martinez, Port Saint Lucie, FL (US); Benjamin Bedard, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/674,188

(22) Filed: May 24, 2024

(65) Prior Publication Data

US 2025/0361874 A1    Nov. 27, 2025

(51) Int. Cl.
| | |
|---|---|
| *F04D 29/38* | (2006.01) |
| *C23C 24/04* | (2006.01) |
| *C23C 24/08* | (2006.01) |
| *F01D 5/28* | (2006.01) |

(52) U.S. Cl.
CPC .......... *F04D 29/388* (2013.01); *C23C 24/04* (2013.01); *C23C 24/087* (2013.01); *F01D 5/288* (2013.01); *F05D 2220/32* (2013.01); *F05D 2220/36* (2013.01); *F05D 2230/31* (2013.01); *F05D 2240/303* (2013.01); *F05D 2300/174* (2013.01); *F05D 2300/604* (2013.01)

(58) Field of Classification Search
CPC .... F04D 29/324; F04D 29/023; F04D 29/388; F04D 29/325; F04D 29/644; F04D 29/38; F04D 19/002; F04D 29/563; F01D 5/288; F05D 2220/36; F05D 2230/31; F05D 2240/303; F05D 2300/174; F05D 2300/604
See application file for complete search history.

(56) References Cited

U.S. PATENT DOCUMENTS

| | | | | | |
|---|---|---|---|---|---|
| 1,141,469 | A | * | 6/1915 | Leiser ...................... | B22F 3/10 |
| | | | | | 419/48 |
| 4,725,512 | A | * | 2/1988 | Scruggs ................... | C21D 7/04 |
| | | | | | 148/403 |

(Continued)

FOREIGN PATENT DOCUMENTS

| | | | |
|---|---|---|---|
| CN | 214290844 | U * | 9/2021 |
| EP | 2362067 | A2 | 8/2011 |

(Continued)

OTHER PUBLICATIONS

Extended European Search Report dated Oct. 28, 2025, for corresponding European Patent Application No. 25178071, 8 pgs.

*Primary Examiner* — Topaz L. Elliott
(74) *Attorney, Agent, or Firm* — Kinney & Lange, P.A.

(57) ABSTRACT

An airfoil includes an airfoil body and a sheath. The airfoil body includes a first metallic material and the sheath includes a second metallic material. An interface connects the sheath to the airfoil body such that the sheath covers a forward edge of the airfoil body to define an airfoil leading edge. The interface includes bulk metallic glass bonding the sheath to the airfoil body.

20 Claims, 8 Drawing Sheets

(56) References Cited

U.S. PATENT DOCUMENTS

| | | | | |
|---|---|---|---|---|
| 6,402,476 | B1* | 6/2002 | Bossmann | F01D 5/286 |
| | | | | 427/318 |
| 6,773,817 | B1* | 8/2004 | Sagel | C22C 45/08 |
| | | | | 428/458 |
| 9,650,897 | B2 | 5/2017 | Deal et al. | |
| 10,450,643 | B2 | 10/2019 | Magdefrau et al. | |
| 11,091,831 | B1* | 8/2021 | El-Wardany | C23C 24/08 |
| 11,891,684 | B2* | 2/2024 | El-Wardany | C23C 28/026 |
| 2011/0129351 | A1 | 6/2011 | Das et al. | |
| 2011/0129600 | A1 | 6/2011 | Das et al. | |
| 2013/0004324 | A1* | 1/2013 | Hansen | C25D 1/02 |
| | | | | 977/777 |
| 2014/0271214 | A1* | 9/2014 | Sutton | F01D 5/282 |
| | | | | 29/889.71 |
| 2015/0104299 | A1* | 4/2015 | Briend | F01D 25/005 |
| | | | | 415/200 |
| 2016/0122557 | A1* | 5/2016 | Magdefrau | B29C 49/22 |
| | | | | 148/403 |
| 2017/0016333 | A1* | 1/2017 | Bruck | B23K 35/361 |
| 2018/0178303 | A1* | 6/2018 | Adharapurapu | C22C 45/04 |
| 2019/0024512 | A1* | 1/2019 | Guivarc'h | F01D 5/147 |
| 2021/0238728 | A1* | 8/2021 | El-Wardany | C23C 24/082 |
| 2021/0340667 | A1* | 11/2021 | El-Wardany | C23C 28/028 |
| 2024/0229654 | A1* | 7/2024 | Adharapurapu | C03C 8/18 |

FOREIGN PATENT DOCUMENTS

| | | | |
|---|---|---|---|
| EP | 3332902 A1 | | 6/2018 |
| JP | 59007705 A | * | 1/1984 |
| JP | S62162302 U | * | 10/1987 |

* cited by examiner

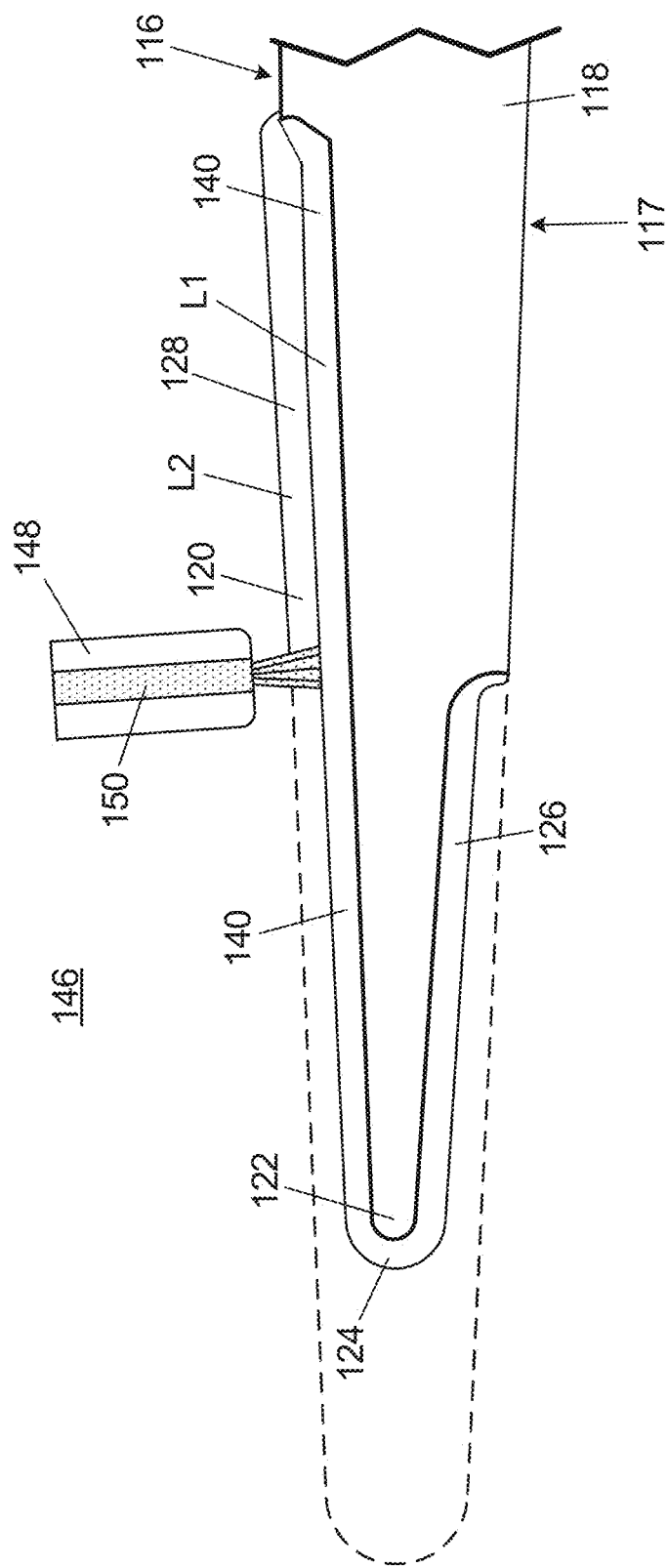

COST-EFFECTIVE SOLID-STATE DEPOSITION OF FUNCTIONALLY GRADED TITANIUM HOLLOW FAN BLADE SHEATH FOR IMPROVED GALVANIC CORROSION RESISTANCE

BACKGROUND

The present disclosure relates to fan blades in gas turbine engines and in particular to fan blades with a protective leading-edge sheath.

Gas turbine engines typically include a fan with multiple fan blades delivering air into a compressor section. The fan blades need to be robust as regulations require a gas turbine engine in commercial service to be capable of ingesting a medium-sized bird while allowing for continued operation or safe and orderly shutdown of the gas turbine engine. Fan blades also need to be robust to resist cracking from nicks and dents caused by the ingestion of small debris, such as sand, ice, and rain.

Fan blades have been made from titanium in the past as titanium is relatively strong and light in weight. However, titanium alloys are often expensive to purchase and manipulate into a finished fan blade. A hybrid fan blade has been developed that includes a leading-edge sheath formed from titanium that is bonded by adhesive to an aluminum fan blade body. Titanium and aluminum are galvanically incompatible materials and contact between titanium and aluminum generally results in galvanic corrosion. To prevent galvanic corrosion, The hybrid fan blade includes an insulating layer that is bonded by adhesives between the aluminum fan blade body and the titanium leading-edge sheath, thereby preventing direct contact between the aluminum fan blade body and the titanium leading-edge sheath. The hybrid fan blade is also relatively expensive due to the complex machining operations required to produce the titanium leading-edge sheath and the aluminum fan blade body.

SUMMARY

In one example, an airfoil includes an airfoil body with a first metallic material and a sheath with a second metallic material. The airfoil body includes a forward edge, a trailing edge aft of the forward edge, a pressure surface extending between the forward edge and the trailing edge, and a suction surface extending between the forward edge and the trailing edge. The sheath includes a head section, a first flank connected to the head section and extending aft from the head section, and a second flank connected to the head section and extending aft from the head section. An interface connects the sheath to the airfoil body such that the head section of the sheath covers the forward edge of the airfoil body to define an airfoil leading edge. The interface includes bulk metallic glass bonding the sheath to the airfoil body.

In another example, a method is disclosed for forming a fan blade. The method includes forming an airfoil body from an aluminum alloy. The airfoil body includes a forward edge, a trailing edge aft of the forward edge, a pressure surface extending between the forward edge and the trailing edge, and a suction surface extending between the forward edge and the trailing edge. The method also includes forming a sheath on the forward edge of the airfoil body to form a leading edge of the fan blade. Forming the sheath includes metallurgically bonding a layer of bulk metallic glass to the forward edge of the airfoil body without phase changing the bulk metallic glass in the layer. Forming the sheath further includes forming over the layer of bulk metallic glass a head section, a first flank connected to the head section and extending aft from the head section, and a second flank connected to the head section and extending aft from the head section. The layer of bulk metallic glass connects the head section, the first flank, and the second flank of the sheath to the airfoil body.

In yet another example, a method is disclosed for forming a titanium component connected to an aluminum component. The method includes metallurgically bonding a layer of titanium-based bulk metallic glass to the aluminum component without phase changing the bulk metallic glass in the layer. The method further includes forming the titanium component over the layer of titanium-based bulk metallic glass such that the layer of titanium-based bulk metallic glass connects the titanium component to the aluminum component.

BRIEF DESCRIPTION OF THE DRAWINGS

FIG. 5A is a cross-sectional view of the metal sheath being formed on the metal airfoil body through cold spray deposition.

DETAILED DESCRIPTION

Figure 1:
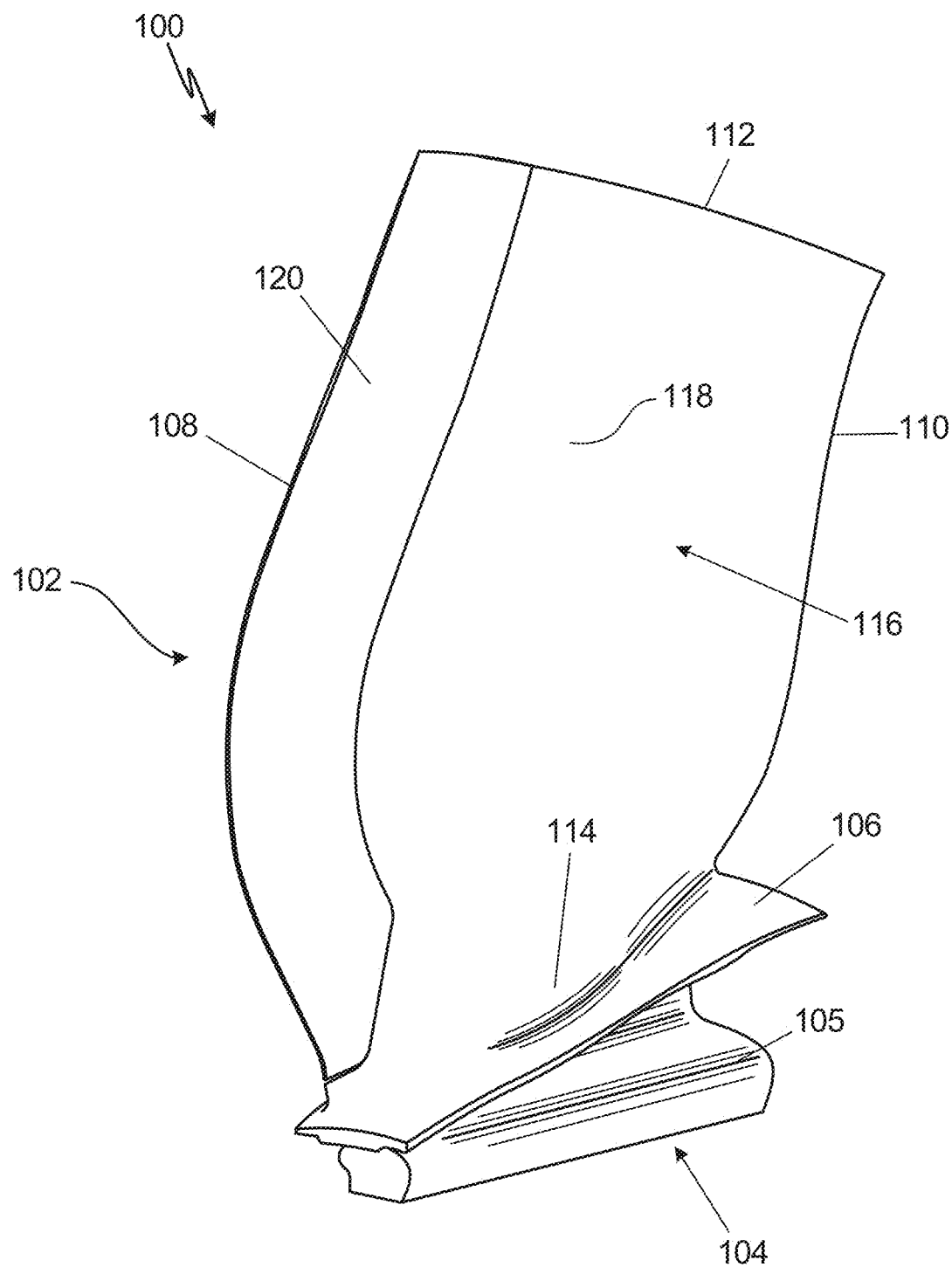
FIG. 1 is a side view of a fan blade with a metal airfoil body and a metal sheath forming a leading edge of the fan blade.

FIG. 1 is a side view of an example of fan blade 100. As shown in FIG. 1, fan blade 100 can include airfoil section 102, root section 104 with dovetail 105, and platform 106. Airfoil section 102 includes leading edge 108, trailing edge 110, tip 112, base 114, suction surface 116, pressure surface 117 (not visible in FIG. 1), airfoil body 118, and sheath 120.

Airfoil section 102 is connected to root section 104 by platform 106. In other examples, airfoil section 102 can be connected directly to root section 104 and platform 106 can be a separate component from fan blade 100. Back to the example of FIG. 1, base 114 of airfoil section 102 is connected to platform 106 and airfoil section 102 extends generally in a spanwise direction in a curved manner to tip 112. Leading edge 108 forms a forward most edge of airfoil section 102. Trailing edge 110 forms an aftmost edge of airfoil section 102 and is spaced from leading edge 108 in a chordwise direction. Both leading edge 108 and trailing edge 110 extend generally spanwise in a curved manner from platform 106 to tip 112. Suction surface 116 extends from leading edge 108 to trailing edge 110 and extends from base 114 to tip 112. Pressure surface 117 forms an opposite side of airfoil section 102 from suction surface 116. Pressure surface 117 also extends from leading edge 108 to trailing edge 110 and extends from base 114 to tip 112.

Sheath 120 and airfoil body 118 together form airfoil section 102. As shown in FIG. 1, airfoil body 118 can form trailing edge 110 and most of pressure surface 117 and suction surface 116. Airfoil body 118 comprises a first metallic material. In the example of FIG. 1, the first metallic material of airfoil body 118 is an aluminum alloy. Suitable examples of aluminum alloy that can form airfoil body 118 include 6XXX-series aluminum alloys, 7XXX-series aluminum alloys, and aluminum-lithium alloys (such as ASTM grades AA 2050, AA 2060, AA 2098 and AA 2195). Any other high-strength aluminum alloy with properties similar to the aluminum alloys listed above can also be used to form airfoil body 118. Forming airfoil body 118 from an aluminum alloy allows airfoil body 118 to be 30-50% lighter in weight compared to the same part formed from a titanium alloy like Ti-6Al-4V. Aluminum alloys are also more ductile than titanium alloys and thus are easier and less costly to form into complex geometries than titanium alloys. Aluminum alloys are generally less resistant to wear than titanium alloys. Sheath 120 is added to airfoil body 118 to protect airfoil section 102 from foreign object damage by making leading edge 108 more durable and reinforcing the portions of suction surface 116 and pressure surface 117 adjacent to leading edge 108.

Sheath 120 covers airfoil 120 proximate leading edge 108, protecting airfoil section 102 from foreign object damage and giving airfoil section 102 a significant amount of strength, even when most of airfoil section 102 is made of a lightweight and more ductile material like an aluminum alloy. Sheath 120 is metallurgically bonded to airfoil body 118 and can form most (if not all) of leading edge 108, a portion of pressure surface 117 just aft of leading edge 108, and a portion of suction surface 116 just aft of leading edge 108. Sheath 120 comprises a second metallic material different from the first metallic material of airfoil body 118 and more durable than the first metallic material. The second metallic material can be a titanium alloy. In the example of FIG. 1, sheath 120 comprises a titanium-based bulk metallic glass (BMG) that is metallurgically bonded to airfoil body 118. Titanium-based BMG is a titanium alloy that includes an amorphous and non-crystalline microstructure. For example, the titanium-based BMG can include Ti40Zr20Cu10Be30 BMG and/or any other equivalent titanium-based BMG with high strength properties and (most importantly) good corrosion resistance. Other possible examples for the titanium-based BMG can include a bulk metallic glass of at least one of Ti-13Nb-13Zr, Ti-12Mo-6Zr-2Fe, Ti-35Nb-7Zr-5Ta, Ti-29Nb-13Ta-4.6Zr, Ti-35Nb-5Ta-7Zr-0.40, Ti-15Mo-5Zr-3Al, and Ti—Mo. All of sheath 120 can comprise and be made of the titanium-based BMG. In other examples, sheath 120 can include a first layer comprising the titanium-based BMG that is metallurgically bonded to airfoil body 118, and at least one subsequent layer comprising another titanium alloy (such as Ti-6Al-4V) formed over the first layer and metallurgically bonded to the first layer. Sheath 120 is discussed in greater detail below with reference to FIG. 2.

Figure 2:
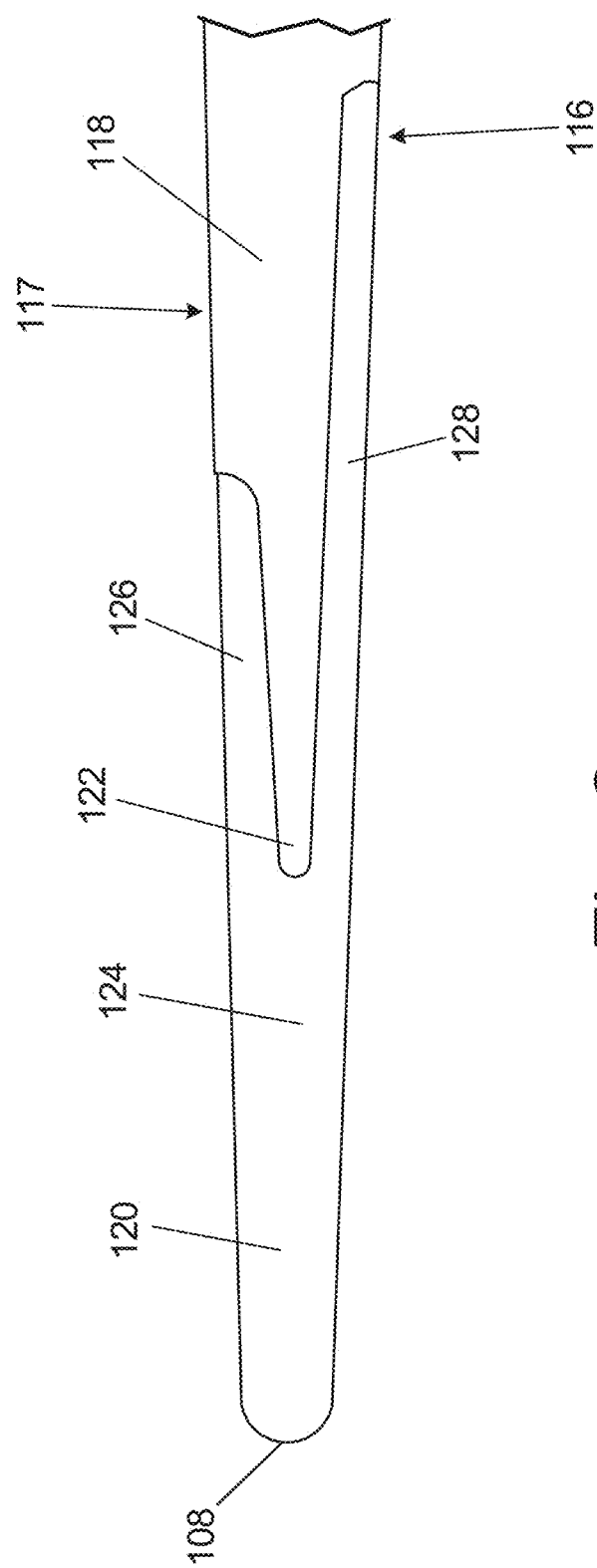
FIG. 2 is a cross-sectional view of a leading-edge portion of the fan blade shown in FIG. 2 taken along line A-A.

FIG. 2 is a cross-sectional view of sheath 120 and a portion of airfoil body 118 taken along line A-A from FIG. 1. As shown in the example of FIG. 2, airfoil body 118 can include forward edge 122 and sheath 120 can include head section 124, first flank 126, and second flank 128. Forward edge 122 and the sections of airfoil body 118 just aft of forward edge 122 can be metallurgically bonded to sheath 120. In the example of FIG. 2, forward edge 122 and the sections of airfoil body 118 just aft of forward edge 122 can be inset relative to suction surface 116 and pressure surface 117 to accommodate sheath 120 such that an outer surface of sheath 120 is flush with an outer surface of airfoil body 118. Head section 124 is metallurgically bonded to forward edge 122. First flank 126 is connected to and integral with head section 124 and extends aft from head section 124. First flank 126 forms a portion of pressure surface 117 of fan blade 100. Second flank 128 is also connected to and integral with head section 124 and extends aft from head section 124. Second flank 128 forms a portion of suction surface 116 of fan blade 100. Forward edge 122 of airfoil body 118 can be between first flank 126 and second flank 128. As shown in FIG. 2, sheath 120 can be connected directly to airfoil body 118 without any intervening adhesive or electric insulation layer between sheath 120 and airfoil body 118.

Generally, a titanium sheath would not be connected directly to an aluminum airfoil body due to galvanic corrosion. However, sheath 120 can be bonded directly to airfoil body 118 because the amorphous and non-crystalline microstructure of the titanium-based BMG in sheath 120 has an electrical conductivity that is multiple orders of magnitude lower than the electrical conductivity of more traditional titanium alloys. Thus, the titanium-based BMG in sheath 120 functions as an insulator to prevent initiation of galvanic corrosion between sheath 120 and airfoil body 118. As discussed below with reference to FIGS. 3A-5B, the titanium-based BMG of sheath 120 is deposited onto airfoil body 118 using a solid state process at a temperature low enough to prevent the amorphous and non-crystalline microstructure of the titanium-based BMG from crystalizing and to prevent the formation of gamma titanium aluminide between sheath 120 and airfoil body 118.

Figure 3A:
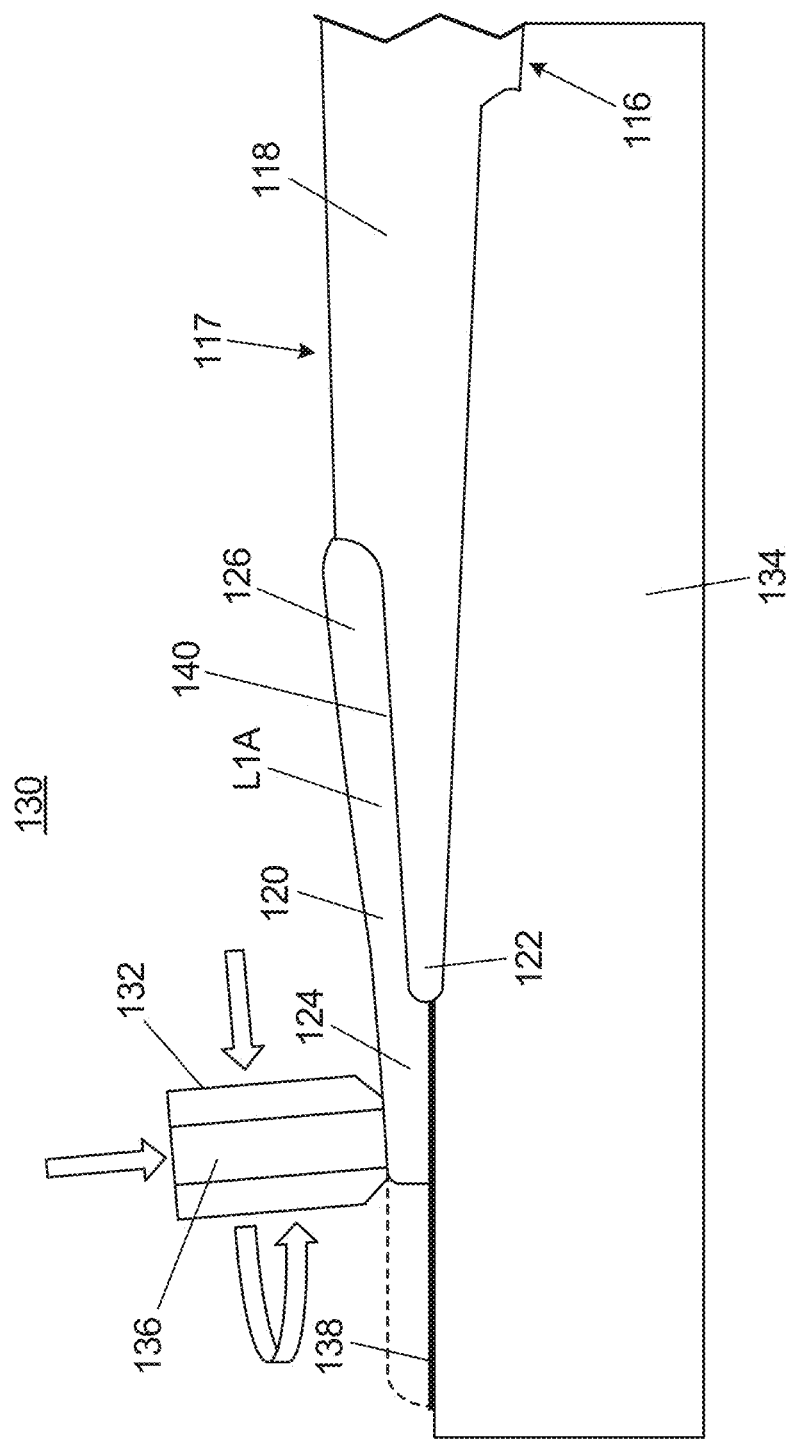
FIG. 3A is a cross-sectional view of a first flank of the metal sheath being formed on the metal airfoil body through friction surface additive manufacturing.

FIG. 3A is a cross-sectional view of first flank 126 of sheath 120 being formed on airfoil body 118 through friction surface additive manufacturing by milling machine 130. As shown in FIG. 3A, milling machine 130 includes hollow tool 132, feedstock bar 136, and fixture 134. To manufacture sheath 120 onto airfoil body 118, airfoil body 118 is loaded onto fixture 134 and fixture 134 is connected to a worktable of milling machine 130. Milling machine 130 can be a CNC milling machine with a spindle modified for connection to hollow tool 132 and a feed system added to supply feedstock bars 136 to hollow tool 132.

Fixture 134 supports airfoil body 118 to prevent airfoil body 118 from bending and deflecting under a downward pressure force applied by hollow tool 132 onto airfoil body 118. In the example of FIG. 3A, airfoil body 118 can be loaded on fixture 134 such that one of suction surface 116 or pressure surface 117 is facing upward toward hollow tool 132 while the other of suction surface 116 or pressure surface 117 is facing downward toward fixture 134. Fixture 134 includes a contoured surface that matches a profile of airfoil body 118. Fixture 134 can include a compressible foam that deforms to form the contoured surface supporting airfoil body 118.

Feedstock bar 136 is a bar of material that is loaded into hollow tool 132 and will be used in the formation of sheath 120. Milling machine 130 can include a continuous feed that automatically loads additional feedstock bars 136 into hollow tool 132, or that automatically feeds a spool of feedstock into hollow tool 132. In the example of FIG. 3A, feedstock bar 136 is a bar of titanium-based BMG, such as Ti40Zr20Cu10Be30. Once airfoil body 118 is connected to fixture 134 and loaded into milling machine 130 and feedstock bar 136 is loaded into hollow tool 132, milling machine 130 can move hollow tool 132 into a position over airfoil body 118 and press feedstock bar 136 into contact with airfoil body 118. Hollow tool 132 and feedstock bar 136 are then rotated by the spindle of milling machine 130 which causes an end of feedstock bar 136 to deform and friction bond to airfoil body 118 without melting feedstock bar 136 or melting airfoil body 118. As milling machine 130 rotates hollow tool 132 and feedstock bar 136, milling machine 130 continues to press feedstock bar 136 against airfoil body 118 while also moving hollow tool 132 and feedstock bar 136 in a lateral direction and a longitudinal direction along forward edge 122 of airfoil body 118 and the portions of airfoil body 118 adjacent to forward edge 122. As milling machine 130 rotates and moves hollow tool 132 and feedstock bar 136, the material of feedstock bar 136 is deposited in at least one layer on airfoil body 118 to build up sheath 120. This process can be referred to as an example of friction surface additive manufacturing or friction stir additive manufacturing.

As milling machine 130 rotates and moves hollow tool 132 and feedstock bar 136 to build up sheath 120 on airfoil body 118, milling machine 130 controls the rotational speed and the downward pressure on feedstock bar 136 to maintain the temperature of the material being deposited onto airfoil body 118 from feedstock bar 136 at a temperature below the melting point of the titanium-based BMG. Milling machine 130 can predict the temperature of the material being deposited onto airfoil body 118 based on mathematical relationships between the properties of the material, the downward pressure applied to the feedstock bar 136, and the rotational speed of the feedstock bar. Milling machine 130 can also include non-contact sensors, such as infrared cameras, to monitor the temperature of the material being deposited on airfoil body 118. Hollow tool 132 deposits the titanium-based BMG from feedstock bar 136 onto airfoil body 118 at a temperature below the melting temperature of the titanium-based BMG to ensure the titanium-based BMG does not undergo a phase change. If the titanium-based BMG were to undergo a phase change, the phase change would convert the amorphous microstructure of the titanium-based BMG into a crystalline microstructure, thereby eliminating the BMG (along with the ductile and insulative benefits of the BMG). To ensure that the titanium-based BMG does not undergo a phase change during formation of sheath 120, milling machine 130 can friction surface additive manufacture the titanium-based BMG to airfoil body 118 at a temperature significantly lower than the melting temperature of the titanium-based BMG. For example, milling machine 130 can friction surface additive manufacture the titanium-based BMG to airfoil body 118 at a temperature that is less than 50% of the melting temperature of the titanium-based BMG.

Figure 3B:
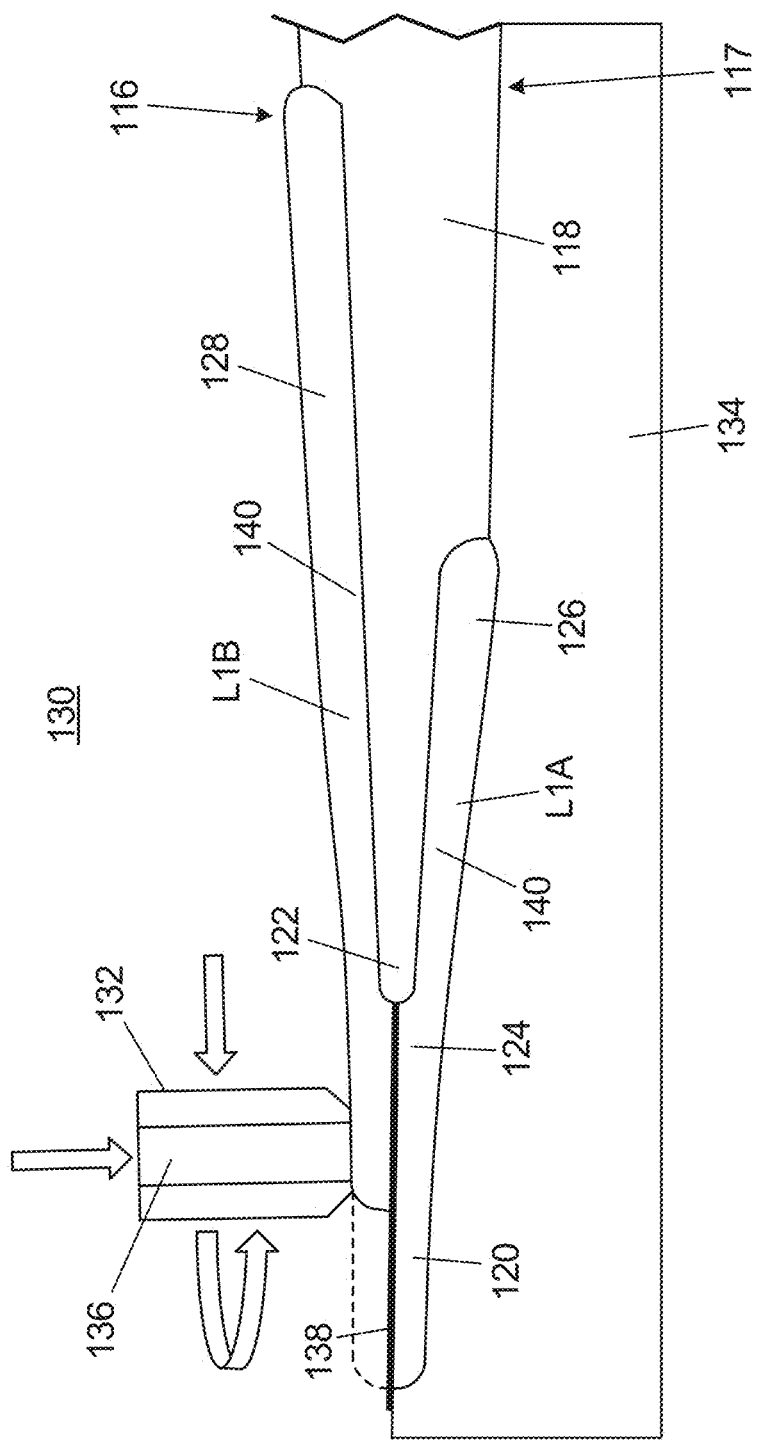
FIG. 3B is a cross-sectional view of a second flank of the metal sheath being formed on the metal airfoil body through friction surface additive manufacturing.

In the example of FIG. 3A, hollow tool 132 starts forming sheath 120 by first depositing a layer L1A of the titanium-based BMG on a pressure side of airfoil body 118 proximate to forward edge 122 to form first flank 126. The layer L1A is metallurgically bonded directly to the aluminum alloy of airfoil body 118 to form interface 140 between the aluminum alloy and the titanium-based BMG. As hollow tool 132 and feedstock bar 136 move away from airfoil body 118 to form head section 124, cover 138 can be present on fixture 134 to prevent the titanium-based BMG from feedstock bar 136 bonding to fixture 134. Cover 138 can be a sacrificial sheet of titanium-based BMG laid on fixture 134 that fuses to the layer L1A. Cover 138 can be disconnected from fixture 134 when layer L1A is completed to allow cover 138 to be rotated along with fan blade 100 to finish forming the rest of sheath 120. In other examples, cover 138 can be a hard and highly polished surface on fixture 134 that is resistive to friction welding with the titanium-based BMG. In the example of FIG. 3B, layer L1A is thick enough to form all of first flank 126 and much of head section 124 of sheath 120. In trial examples, milling machine 130 was capable of depositing layers of titanium-based BMG from as thick as 0.01 inches (0.25 mm) to 0.09 inches (2.29 mm) through friction surface additive manufacturing without causing a phase change of the titanium-based BMG. That range of thicknesses is sufficient to deposit each of first flank 126 and second flank 128 in a single pass if desired.

Once hollow tool 132 and feedstock bar 136 has deposited all of layer L1A to form a pressure side of sheath 102 in the example of FIG. 3A, fan blade 100 can be repositioned relative to fixture 134 so that hollow tool 132 and feedstock bar 136 can form a suction side of sheath 102, as shown in the example of FIG. 3B. In FIG. 3B, fan blade 100 has been rotated relative to fixture 134 such that pressure surface 117 faces toward fixture 134 and suction surface 116 faces toward hollow tool 132 and feedstock bar 136. To form second flank 128, hollow tool 132 and feedstock bar 136 deposit layer L1B of the titanium-based BMG on airfoil body 118 proximate to forward edge 122 to form second flank 128. The layer L1B is also metallurgically bonded directly to the aluminum alloy of airfoil body 118 to form interface 140 between the aluminum alloy and the titanium-based BMG on the suction side. As hollow tool 132 and feedstock bar 136 move away from airfoil body 118 to finish forming head section 124, layer L1B can continue onto cover 138 and metallurgically bond with cover 138.

Figure 3C:
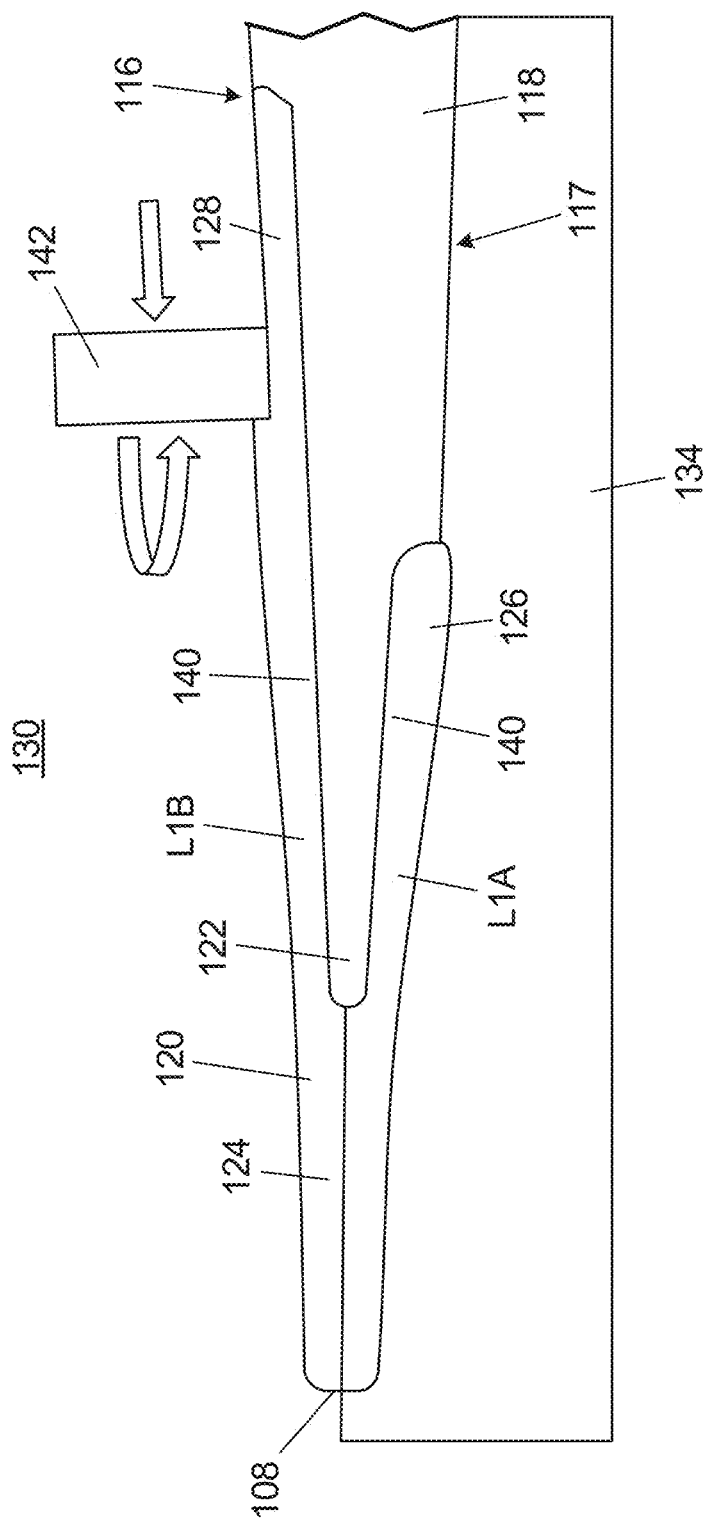
FIG. 3C is a cross-sectional view of an outer surface of the metal sheath being machine milled after being formed on the metal airfoil body through friction surface additive manufacturing.

Once hollow tool 132 and feedstock bar 136 of milling machine 130 has friction surface additive manufactured sheath 120 onto airfoil body 118, milling machine 130 can swap out hollow tool 132 for cutting tool 142 to trim off any excess of cover 138 extending beyond leading edge 108 and to surface finish an outer surface of sheath 120, as shown in FIG. 3C. In the example of FIG. 3C, layer L1A is metallurgically bonded to airfoil body 118 by interface 140, layer L1B is metallurgically bonded to airfoil body 118 by interface 40, and layer L1A is metallurgically bonded to layer L1B in head section 124 of sheath 120. As noted above, interface 140 is where the titanium-based BMG of sheath 120 connects to the aluminum alloy of airfoil body 118. Since interface 140 is a direct metallurgical bond between airfoil body 118 and sheath 120, only the outer surface of sheath 120 requires additional milling and/or surface finishing. The friction surface additive manufacturing process of sheath 120 can cause the unfinished outer surface of sheath 120 to be rough. As shown in FIG. 3C, milling machine 130 can use cutting tool 142 to trim away the unfinished outer surface of sheath 120 such that the outer surface of sheath 120 is smooth and continuous with suction surface 116 and pressure surface 117. As milling machine 130 shapes and smooths the outer surface of sheath 120, fixture 134 can provide backing support opposite cutting tool 142 to prevent deflection and bending of fan blade 100. In other examples, milling machine 130 can include a backing anvil that is articulated by milling machine 130 to follow cutting tool 142 and an opposite side of fan blade 100 from cutting tool 142 to provide backing support. Once milling machine 130 has finished shaping the outer surface of sheath 120 with cutting tool 142, the outer surface of sheath 120 can undergo a deep rolling process and/or a polishing process by milling machine 130 or by another machine.

While the example of FIG. 3C, shows sheath 120 being formed by layer L1A and layer L1B, milling machine 130 can friction surface additive manufacture a larger number of layers into sheath 120 with each layer having a thickness thinner than layer L1A and layer L1B. In some examples, milling machine 130 can deposit a first layer of sheath 120 comprising the titanium-based BMG and forming interface 140 with airfoil body 118, and milling machine 130 can deposit a second layer of sheath 120 over the first layer and comprising a titanium alloy different from the titanium-based BMG. The second layer does not contact airfoil body 118 directly and the first layer comprising the titanium-based BMG acts as an insulative layer between the second layer and the airfoil body 118. In other examples, the first layer and the second layer overlying the first layer can both be titanium-based BMG.

Figure 4:
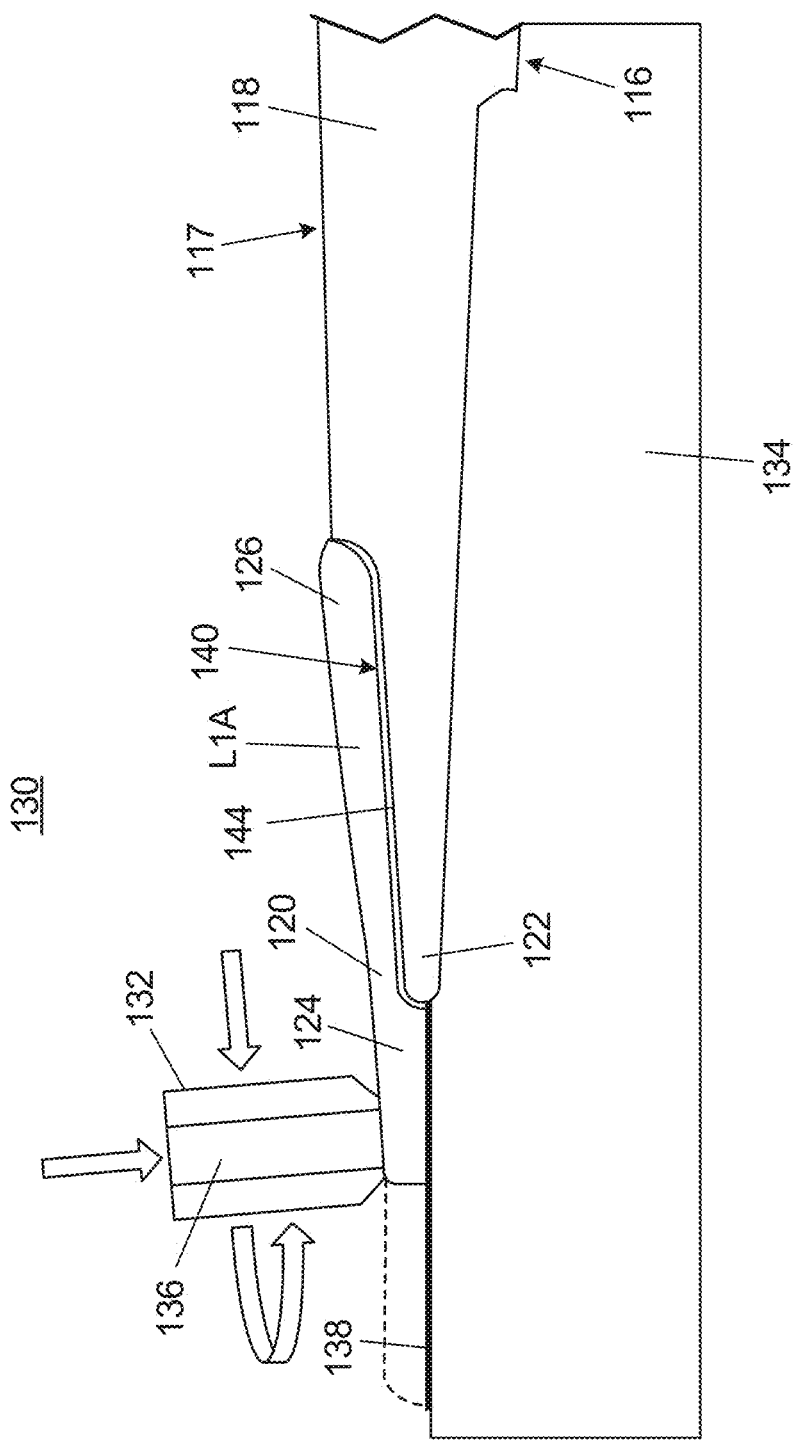
FIG. 4 is a cross-sectional view of another example of the metal sheath being formed on the metal airfoil body through friction surface additive manufacturing.

FIG. 4 is a cross-sectional view of another example of sheath 120 being formed on airfoil body 118 by milling machine 130 through friction surface additive manufacturing. In the example of FIG. 4, interface 140 includes isolative layer 144. Isolative layer 144 is a first layer of material deposited by hollow tool 132 on forward end 122 of airfoil body 118 and the portions of airfoil body 118 just aft of forward end 122 that will eventually be covered by sheath 120. Isolative layer 144 can include nickel, silver, magnesium, or any other metal with good resistance to corrosion and that will not interact with aluminum and generate aluminide. To deposit isolative layer 144, hollow tool 132 can use a feedstock bar formed of the same material that will make up isolative layer 144. In other examples, isolative layer 144 can be deposited onto airfoil body 118 through another process (such as electroplating, cold spray deposition, or hot-dip coating) prior to loading airfoil body 118 into milling machine 130.

After isolative layer 144 has been formed on airfoil body 118, feedstock bar 136 of the titanium-based BMG can be loaded into hollow tool 132 and hollow tool 132 can proceed to form layer L1A of titanium-based BMG over isolative layer 144 without phase changing the titanium-based BMG. Layer L1A is metallurgically bonded to isolative layer 144, and isolative layer 144 bonds layer L1A to the aluminum alloy of airfoil body 118. Thus, interface 140 in the example of FIG. 4 includes a metallurgical bond between the metal of isolative layer 144 and the aluminum alloy of airfoil body 118 and a metallurgical bond between the titanium-based BMG of layer L1A and the metal of isolative layer 144. While the titanium-based BMG of layer L1A is already relatively resistive against galvanic corrosion when compared to titanium alloys with crystalline microstructure, isolative layer 144 provides additional protection against chemical interaction and corrosion between sheath 120 and airfoil body 118.

FIG. 5A is a cross-sectional view of another example of sheath 120 being formed on airfoil body 118 through cold spray deposition. As shown in FIG. 5A, cold spray system 146 includes nozzle 148 that directs a stream of particles 150 at supersonic speeds at airfoil body 118 to deposit particles 150 as a solid-state coating on airfoil body 118, which eventually builds up layer by layer to form sheath 120. In the example of FIG. 5A, cold spray system 146 has already deposited first layer L1 over the portion of airfoil body 118 that will be covered by sheath 120 and has commenced to form second layer L2 over first layer L1. First layer L1 is made up from particles 150 of titanium-based BMG that was deposited directly on the aluminum alloy of airfoil body 118. As the titanium-based BMG of first layer L1 was formed on airfoil body 118 through cold spray deposition, the titanium-based BMG is metallurgically bonded to the aluminum alloy of airfoil body 118 to form interface 140 without phase changing the titanium-based BMG. In other examples, isolative layer 144 (shown in FIG. 4) can be formed between first layer L1 and airfoil body 118.

Figure 5B:
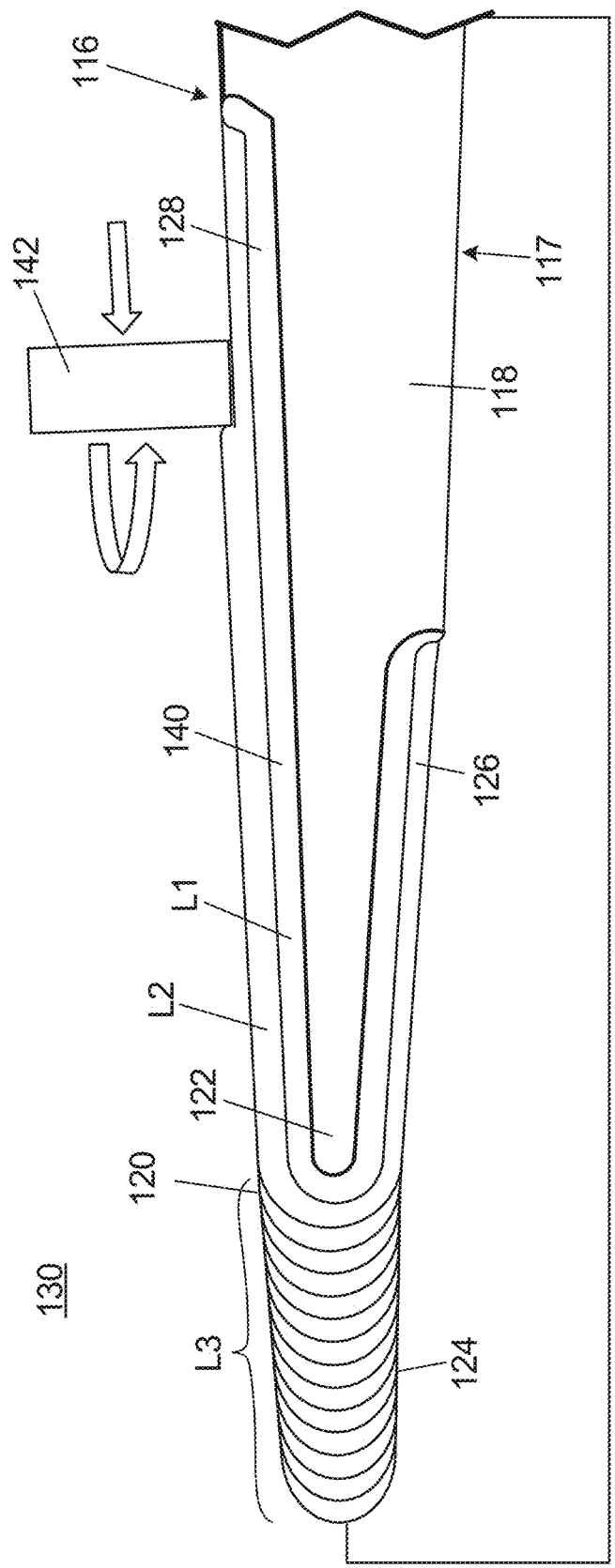
FIG. 5B is a cross-sectional view of an outer surface of the metal sheath being machine milled after being formed on the metal airfoil body through cold spray deposition.

Second layer L2 can also be made up of particles 150 of titanium-based BMG. In other examples, second layer L2 can be made up of particles 150 of other titanium alloys. Second layer L2 is metallurgically bonded to first layer L1 without undergoing a phase change as particles 150 never reach their melting temperature before being depositing onto first layer L1 and fusing to first layer L1. Cold spray system 146 can continue to build additional layers L3 (shown in FIG. 5B) until the general shape and form of sheath 120 is created on airfoil body 118. Once the general shape and form of sheath 120 is created on airfoil body 118, fan blade 100 can be loaded into milling machine 130 and the outer surface of sheath 120 can be milled and smoothed by cutting tool 142, as shown in FIG. 5B.

The methods of forming sheath 120 on airfoil body 118 shown and discussed in FIGS. 3A-5B provide numerous advantages and benefits over previous hybrid metal fan blades. Forming sheath 120 directly onto airfoil body 118 eliminates the need to machine an inside surface of sheath 120 to match a profile of forward edge 122 of airfoil body 188 and vice-versa. The titanium-based BMG of sheath 120 also eliminates the need to include a separate insulating layer between sheath 120 and airfoil body 118 to prevent galvanic corrosion. When forming sheath 120 through friction surface additive manufacturing, sheath 120 can be completely formed, connected to airfoil body 118, and surface finished all within milling machine 130. Being able to completely form and attach sheath 120 to airfoil body 118 within a single machine reduces operating space and time needed to produce sheath 120. The friction surface additive manufacturing process and the cold spray deposition process each also imparts a compressive residual stress profile during deposition that imparts corrosion resistance to sheath 120, forms a very strong metallurgical bond between sheath 120 and airfoil body 118, and enhances the material properties of sheath 120.

Discussion of Possible Embodiments

The following are non-exclusive descriptions of possible embodiments of the present invention.

An airfoil includes an airfoil body with a first metallic material and a sheath with a second metallic material. The airfoil body includes a forward edge, a trailing edge aft of the forward edge, a pressure surface extending between the forward edge and the trailing edge, and a suction surface extending between the forward edge and the trailing edge. The sheath includes a head section, a first flank connected to the head section and extending aft from the head section, and a second flank connected to the head section and extending aft from the head section. An interface connects the sheath to the airfoil body such that the head section of the sheath covers the forward edge of the airfoil body to define an airfoil leading edge. The interface includes bulk metallic glass bonding the sheath to the airfoil body.

The airfoil of the preceding paragraph can optionally include, additionally and/or alternatively, any one or more of the following features, configurations and/or additional components in the paragraphs below.

In an embodiment of the foregoing airfoil, the first metallic material is an aluminum alloy.

In an embodiment of the foregoing airfoil, the second metallic material is a titanium alloy.

In an embodiment of the foregoing airfoil, the bulk metallic glass of the interface comprises titanium-based bulk metallic glass.

In an embodiment of the foregoing airfoil, the titanium alloy comprises titanium-based bulk metallic glass.

In an embodiment of the foregoing airfoil, the interface further comprises: a first layer comprising at least one of nickel, silver, and magnesium, wherein the first layer is metallurgically bonded directly to the aluminum alloy of the airfoil body; and a second layer comprising the titanium-based bulk metallic glass, wherein the second layer is metallurgically bonded to the first layer.

In an embodiment of the foregoing airfoil, the titanium-based bulk metallic glass of the interface is metallurgically bonded directly to the aluminum alloy of the airfoil body.

A method is disclosed for forming a fan blade. The method includes forming an airfoil body from an aluminum alloy. The airfoil body includes a forward edge, a trailing edge aft of the forward edge, a pressure surface extending between the forward edge and the trailing edge, and a suction surface extending between the forward edge and the trailing edge. The method also includes forming a sheath on the forward edge of the airfoil body to form a leading edge of the fan blade. Forming the sheath includes metallurgically bonding a layer of bulk metallic glass to the forward edge of the airfoil body without phase changing the bulk metallic glass in the layer. Forming the sheath further includes forming over the layer of bulk metallic glass a head section, a first flank connected to the head section and extending aft from the head section, and a second flank connected to the head section and extending aft from the head section. The layer of bulk metallic glass connects the head section, the first flank, and the second flank of the sheath to the airfoil body.

The method of the preceding paragraph can optionally include, additionally and/or alternatively, any one or more of the following features, configurations and/or additional components in the paragraphs below.

In an embodiment of the foregoing method, metallurgically bonding the layer of bulk metallic glass to the forward edge of the airfoil body without phase changing the bulk metallic glass in the layer comprises: friction surface additive manufacturing the layer of bulk metallic glass to the aluminum alloy of the airfoil body at a temperature less than a melting temperature of the bulk metallic glass.

In an embodiment of the foregoing method, the layer of bulk metallic glass comprises titanium-based bulk metallic glass.

In an embodiment of the foregoing method, the method further comprising: friction surface additive manufacturing the layer of bulk metallic glass to the forward edge of the airfoil body at a temperature less than 50% of the melting temperature of the bulk metallic glass.

In an embodiment of the foregoing method, forming over the layer of bulk metallic glass the head section, the first flank, and the second flank comprises: friction surface additive manufacturing at least one layer of titanium alloy over the layer of bulk metallic glass to form an outer surface of the sheath; and machining the outer surface of the sheath.

In an embodiment of the foregoing method, metallurgically bonding the layer of bulk metallic glass to the forward edge of the airfoil body without phase changing the bulk metallic glass in the layer comprises: cold spray depositing the layer of bulk metallic glass directly to the aluminum alloy of the airfoil body at a temperature less than a melting temperature of the bulk metallic glass.

In an embodiment of the foregoing method, the layer of bulk metallic glass comprises titanium-based bulk metallic glass.

In an embodiment of the foregoing method, forming over the layer of bulk metallic glass the head section, the first flank, and the second flank comprises: cold spray depositing at least one layer of titanium alloy over the layer of bulk metallic glass to form an outer surface of the sheath; and machining the outer surface of the sheath.

In an embodiment of the foregoing method, metallurgically bonding the layer of bulk metallic glass to the forward edge of the airfoil body without phase changing the bulk metallic glass in the layer comprises: friction surface additive manufacturing an isolative layer directly to the aluminum alloy of the airfoil body at the forward edge at a temperature less than a melting temperature of the isolative layer, wherein the isolative layer comprises at least one of nickel, silver, and magnesium; and friction surface additive manufacturing the layer of bulk metallic glass to the isolative layer at a temperature less than a melting temperature of the bulk metallic glass such that the isolative layer metallurgically bonds the layer of bulk metallic glass to the forward edge of the airfoil body.

In an embodiment of the foregoing method, the layer of bulk metallic glass comprises titanium-based bulk metallic glass.

In an embodiment of the foregoing method, metallurgically bonding the layer of bulk metallic glass to the forward edge of the airfoil body without phase changing the bulk metallic glass in the layer comprises: cold spray depositing an isolative layer directly to the aluminum alloy of the airfoil body at the forward edge at a temperature less than a melting temperature of the isolative layer, wherein the isolative layer comprises at least one of nickel, silver, and magnesium; and cold spray depositing the layer of bulk metallic glass to the isolative layer at a temperature less than a melting temperature of the bulk metallic glass such that the isolative layer metallurgically bonds the layer of bulk metallic glass to the forward edge of the airfoil body.

In an embodiment of the foregoing method, the layer of bulk metallic glass comprises titanium-based bulk metallic glass.

A method is disclosed for forming a titanium component connected to an aluminum component. The method includes metallurgically bonding a layer of titanium-based bulk metallic glass to the aluminum component without phase changing the bulk metallic glass in the layer. The method further includes forming the titanium component over the layer of titanium-based bulk metallic glass such that the layer of titanium-based bulk metallic glass connects the titanium component to the aluminum component.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, while the above disclosure describes a method of forming and joining sheath 120 to airfoil body 118, the same method can be adapted to connect another titanium component to an aluminum component. One such example can be forming root pads with a layer of titanium-based BMG that metallurgically bonds the root pads to dovetail 105 of root section 104 to protect root section 104 against wear when fan blade 100 is mounted into a rotor disk. Also, while the above disclosure is directed to fan blades in gas turbine engines, the disclosure can also be adapted for use in other rotating and stationary airfoils within a gas turbine engine, such as vanes and struts. Therefore, it is intended that the invention not be limited to the particular embodiment(s) disclosed, but that the invention will include all embodiments falling within the scope of the appended claims.

The invention claimed is:

1. An airfoil comprising:
    an airfoil body comprising a first metallic material, wherein the airfoil body comprises a forward edge, a trailing edge aft of the forward edge, a pressure surface extending between the forward edge and the trailing edge, and a suction surface extending between the forward edge and the trailing edge; and
    a sheath comprising a second metallic material, wherein the sheath comprises:
    a head section;
    a first flank connected to the head section and extending aft from the head section; and
    a second flank connected to the head section and extending aft from the head section; and
    an interface connecting the sheath to the airfoil body such that the head section of the sheath covers the forward edge of the airfoil body to define an airfoil leading edge, wherein the interface comprises bulk metallic glass bonding the sheath to the airfoil body, and wherein the bulk metallic glass is friction bonded to the airfoil body.

2. The airfoil of claim 1, wherein the first metallic material is an aluminum alloy.

3. The airfoil of claim 2, wherein the second metallic material is a titanium alloy.

4. The airfoil of claim 3, wherein the bulk metallic glass of the interface comprises titanium-based bulk metallic glass.

5. The airfoil of claim 4, wherein the titanium alloy comprises titanium-based bulk metallic glass.

6. The airfoil of claim 4, wherein the interface further comprises:
    a first layer comprising at least one of nickel, silver, and magnesium, wherein the first layer is metallurgically bonded directly to the aluminum alloy of the airfoil body; and
    a second layer comprising the titanium-based bulk metallic glass, wherein the second layer is metallurgically bonded to the first layer.

7. The airfoil of claim 4, wherein the titanium-based bulk metallic glass of the interface is metallurgically bonded directly to the aluminum alloy of the airfoil body.

8. The airfoil of claim 1, wherein the sheath is friction bonded to the interface, wherein the bulk metallic glass is friction bonded to the airfoil body without the bulk metallic glass undergoing a phase change, and wherein the sheath is friction bonded to the bulk metallic glass of the interface without undergoing a phase change, and wherein the bulk metallic glass is friction bonded to the airfoil body by at least one of friction stir additive manufacturing and cold spray deposition, and wherein the sheath is friction bonded to the bulk metallic glass of the interface by at least one of friction stir additive manufacturing and cold spray deposition.

9. A method of forming a fan blade comprising:
    forming an airfoil body from an aluminum alloy, wherein the airfoil body comprises a forward edge, a trailing edge aft of the forward edge, a pressure surface extending between the forward edge and the trailing edge, and a suction surface extending between the forward edge and the trailing edge; and
    forming a sheath on the forward edge of the airfoil body to form a leading edge of the fan blade, wherein forming the sheath comprises:
    metallurgically bonding a layer of bulk metallic glass to the forward edge of the airfoil body without phase changing the bulk metallic glass in the layer, thereby forming a friction bond between the layer of bulk metallic glass and the airfoil body;
    forming over the layer of bulk metallic glass a head section, a first flank connected to the head section and extending aft from the head section, and a second flank connected to the head section and extending aft from the head section, and wherein the layer of bulk metallic glass connects the head section, the first flank, and the second flank of the sheath to the airfoil body.

10. The method of claim 9, wherein metallurgically bonding the layer of bulk metallic glass to the forward edge of the airfoil body without phase changing the bulk metallic glass in the layer comprises:
    friction surface additive manufacturing the layer of bulk metallic glass to the aluminum alloy of the airfoil body at a temperature less than a melting temperature of the bulk metallic glass.

11. The method of claim 10, wherein the layer of bulk metallic glass comprises titanium-based bulk metallic glass.

12. The method of claim 11, further comprising:
    friction surface additive manufacturing the layer of bulk metallic glass to the forward edge of the airfoil body at a temperature less than 50% of the melting temperature of the bulk metallic glass.

13. The method of claim 12, wherein forming over the layer of bulk metallic glass the head section, the first flank, and the second flank comprises:
    friction surface additive manufacturing at least one layer of titanium alloy over the layer of bulk metallic glass to form an outer surface of the sheath; and
    machining the outer surface of the sheath.

14. The method of claim 9, wherein metallurgically bonding the layer of bulk metallic glass to the forward edge of the airfoil body without phase changing the bulk metallic glass in the layer comprises:
    cold spray depositing the layer of bulk metallic glass directly to the aluminum alloy of the airfoil body at a temperature less than a melting temperature of the bulk metallic glass.

15. The method of claim 14, wherein the layer of bulk metallic glass comprises titanium-based bulk metallic glass.

16. The method of claim 15, wherein forming over the layer of bulk metallic glass the head section, the first flank, and the second flank comprises:
    cold spray depositing at least one layer of titanium alloy over the layer of bulk metallic glass to form an outer surface of the sheath; and
    machining the outer surface of the sheath.

17. The method of claim 9, wherein metallurgically bonding the layer of bulk metallic glass to the forward edge of the airfoil body without phase changing the bulk metallic glass in the layer comprises:
    friction surface additive manufacturing an isolative layer directly to the aluminum alloy of the airfoil body at the forward edge at a temperature less than a melting temperature of the isolative layer, wherein the isolative layer comprises at least one of nickel, silver, and magnesium; and
    friction surface additive manufacturing the layer of bulk metallic glass to the isolative layer at a temperature less than a melting temperature of the bulk metallic glass such that the isolative layer metallurgically bonds the layer of bulk metallic glass to the forward edge of the airfoil body.

18. The method of claim 17, wherein the layer of bulk metallic glass comprises titanium-based bulk metallic glass.

19. The method of claim 9, wherein metallurgically bonding the layer of bulk metallic glass to the forward edge of the airfoil body without phase changing the bulk metallic glass in the layer comprises:
   cold spray depositing an isolative layer directly to the aluminum alloy of the airfoil body at the forward edge at a temperature less than a melting temperature of the isolative layer, wherein the isolative layer comprises at least one of nickel, silver, and magnesium; and
   cold spray depositing the layer of bulk metallic glass to the isolative layer at a temperature less than a melting temperature of the bulk metallic glass such that the isolative layer metallurgically bonds the layer of bulk metallic glass to the forward edge of the airfoil body.

20. The method of claim 19, wherein the layer of bulk metallic glass comprises titanium-based bulk metallic glass.

\* \* \* \* \*